(12) United States Patent
Georgiou et al.

(10) Patent No.: US 10,248,081 B2
(45) Date of Patent: Apr. 2, 2019

(54) HOLOGRAPHIC PHASE AND AMPLITUDE SPATIAL LIGHT MODULATION

(71) Applicant: Microsoft Technology Licensing, LLC, Redmond, WA (US)

(72) Inventors: Andreas Georgiou, Cambridge (GB); Adrian Travis, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 63 days.

(21) Appl. No.: 15/456,405

(22) Filed: Mar. 10, 2017

(65) Prior Publication Data

US 2018/0259904 A1 Sep. 13, 2018

(51) Int. Cl.
*G03H 1/08* (2006.01)
*G03H 1/22* (2006.01)
(Continued)

(52) U.S. Cl.
CPC ....... *G03H 1/0891* (2013.01); *G02F 1/13725* (2013.01); *G03H 1/02* (2013.01);
(Continued)

(58) Field of Classification Search
CPC .. G03H 1/0443; G03H 2001/045; G03H 1/08; G03H 1/0866; G03H 1/2202;
(Continued)

(56) References Cited

U.S. PATENT DOCUMENTS

| 5,535,029 A | 7/1996 | Clark |
| 5,543,251 A | 8/1996 | Taylor |

(Continued)

FOREIGN PATENT DOCUMENTS

| CN | 102621823 A | 8/2012 |
| EP | 1186939 A2 | 3/2002 |

(Continued)

OTHER PUBLICATIONS

Putten, et al., "Spatial amplitude and phase modulation using commercial twisted nematic LCDs", In Journal of Applied Optics vol. 47, Issue 12, Apr. 20, 2008, pp. 1-13.

(Continued)

*Primary Examiner* — Arnel C Lavarias
(74) *Attorney, Agent, or Firm* — Alleman Hall Creasman & Tuttle LLP (57) ABSTRACT

A holographic display includes a pixel array including one or more pixels, a holographic data source, a drive array, and a light source. Each pixel includes a phase-modulating structure and an amplitude-modulating structure. The holographic data source is configured to supply a holographic drive signal. The holographic drive signal includes, for each pixel in each of a plurality of time-varying holographic image frames, a phase component defining phase modulation for the pixel and an amplitude component defining amplitude modulation for the pixel. The drive array is configured to, for each pixel in each holographic image frame, modulate the phase-modulating structure according to the phase component and modulate the amplitude-modulating structure according to the amplitude component. The light source is configured to output coherent light to illuminate the one or more pixels of the pixel array.

20 Claims, 7 Drawing Sheets

(51) Int. Cl.
*G02F 1/137* (2006.01)
*G03H 1/02* (2006.01)
*G09G 3/20* (2006.01)
*G02F 1/1343* (2006.01)
*G02F 1/139* (2006.01)
*G09G 3/00* (2006.01)

(52) U.S. Cl.
CPC ......... *G03H 1/2294* (2013.01); *G09G 3/2014* (2013.01); *G02F 1/1393* (2013.01); *G02F 1/134363* (2013.01); *G02F 2001/134381* (2013.01); *G03H 2001/0224* (2013.01); *G03H 2001/2297* (2013.01); *G03H 2222/31* (2013.01); *G03H 2222/33* (2013.01); *G03H 2223/22* (2013.01); *G03H 2225/22* (2013.01); *G03H 2225/34* (2013.01); *G03H 2225/36* (2013.01); *G03H 2225/55* (2013.01); *G09G 3/003* (2013.01)

(58) Field of Classification Search
CPC ......... G03H 2001/2223; G03H 1/2294; G03H 2225/00; G03H 2225/30; G03H 2225/33; G03H 225/34; G03H 2225/35; G03H 2225/36; G03H 2240/00; G03H 2240/10; G03H 2240/13; G03H 2240/15
USPC .......................... 359/1, 9, 21, 29, 32, 33, 35
See application file for complete search history.

(56) References Cited

U.S. PATENT DOCUMENTS

| | | | |
|---|---|---|---|
| 5,661,577 | A | 8/1997 | Jenkins et al. |
| 5,844,700 | A | 12/1998 | Jeganathan et al. |
| 6,266,167 | B1 | 7/2001 | Klug et al. |
| 6,293,898 | B1 | 9/2001 | Yang |
| 6,373,806 | B1 | 4/2002 | Kitamura et al. |
| 6,710,901 | B2 | 3/2004 | Pastor |
| 6,897,433 | B2 | 5/2005 | Itoh et al. |
| 6,999,397 | B2 | 2/2006 | Roh et al. |
| 7,200,097 | B2 | 4/2007 | Meyrueis et al. |
| 7,502,157 | B1 | 3/2009 | Dueweke |
| 7,733,557 | B2 | 6/2010 | Handschy et al. |
| 8,605,561 | B2 | 12/2013 | Gladney et al. |
| 8,687,252 | B2 * | 4/2014 | Leister ............... G03H 1/02 359/11 |
| 8,808,944 | B2 | 8/2014 | Lawrence et al. |
| 9,474,143 | B2 | 10/2016 | Zhan et al. |
| 9,734,858 | B2 | 8/2017 | Barada et al. |
| 2005/0180291 | A1 | 8/2005 | Ogasawara |
| 2006/0280094 | A1 | 12/2006 | Tsukagoshi et al. |
| 2007/0139586 | A1 | 6/2007 | Gu et al. |
| 2008/0254372 | A1 | 10/2008 | Wu |
| 2009/0207710 | A1 | 8/2009 | Ayres et al. |
| 2010/0046050 | A1 | 2/2010 | Kroll et al. |
| 2010/0118219 | A1 | 5/2010 | Leister |
| 2010/0125356 | A1 | 5/2010 | Shkolnik et al. |
| 2010/0195178 | A1 | 8/2010 | Leister et al. |
| 2011/0094585 | A1 | 4/2011 | Debije et al. |
| 2012/0300608 | A1 | 11/2012 | Masumura |
| 2013/0021545 | A1 | 1/2013 | Song et al. |
| 2014/0009808 | A1 | 1/2014 | Wang et al. |
| 2014/0078878 | A1 | 3/2014 | Tsuyama et al. |
| 2014/0204437 | A1 | 7/2014 | Ayres et al. |
| 2015/0277551 | A1 | 10/2015 | Travis |
| 2016/0320640 | A1 * | 11/2016 | Han ............... G02B 27/22 |

FOREIGN PATENT DOCUMENTS

| | | |
|---|---|---|
| EP | 2264839 A2 | 12/2010 |
| JP | H06289353 A | 10/1994 |

OTHER PUBLICATIONS

Zhu, et al., "Arbitrary manipulation of spatial amplitude and phase using phase-only spatial light modulators", In Journal of Scientific reports, vol. 4, Dec. 11, 2014, pp. 1-7.

Lin, et al., "Polarisation-independent liquid crystal devices", In Journal of Journal Liquid Crystals Today, vol. 17, No. 1-2, Jul. 2008, pp. 2-8.

Lin, et al., "A Polarizer-free Liquid Crystal Display using Dye-doped Liquid Crystal Gels", In Journal of Materials, vol. 2, Oct. 26, 2009, pp. 1662-1673.

Nolte, S. et al., "Femtosecond waveguide writing: a new avenue to three-dimensional integrated optics," Applied Physics A, Materials Science & Processing, vol. 77, Issue 1, Jun. 2003, 3 pages.

Kumar, A. et al., "Making an optical vortex and its copies using a single spatial light modulator," Physics Letters A, vol. 375, Issue 41, Sep. 26, 2011, 7 pages.

Granger, C., "Polarization Control of Light with a Liquid Crystal Display Spatial Light Modulator," Thesis Presented to the Faculty of San Diego State University, 2013, 80 pages.

Zhang, J. et al., "5D Data Storage by Ultrafast Laser Nanostructuring in Glass," In Proceedings of the CLEO: Science & Innovations Conference, San Jose, CA, USA, Jun. 9, 2013, 2 pages.

Zhang, Z. et al., "Fundamentals of phase-only liquid crystal on silicon (LCOS) devices," In Journal of Light: Science and Applications, vol. 3, Oct. 24, 2014, 10 pages.

Kazansky, P. et al., "Eternal 5D data storage via ultrafast-laser writing in glass," In Proceedings of International Society for Optics and Phototonics, vol. 9736, Mar. 4, 2016, 3 pages.

Wang, J. et al., "The Polarization Multiplexing Image with a Single Diffractive Optical Element," In Journal of IEEE Phototonics, vol. 9, No. 3, Jun. 2017, 9 pages.

Georgiou, A. et al., "Multi-Beam Optical System for Fast Writing of Data on Glass," Application as Filed in U.S. Appl. No. 15/699,597, filed Sep. 8, 2017, 40 pages.

Wang, T. et al., "Generation of perfect polarization vortices using combined grating in a single spatial light modulator," In Journal of Applied Optics, vol. 56, Issue 27, Sep. 20, 2017, 1 page.

Georgiou, A. et al., "Data Storage Using Light of Spatially Modulated Phase and Polarization," Application as Filed in U.S. Appl. No. 15/894,778, filed Feb. 12, 2018, 35 pages.

Eng, S. et al., "Optimization of Liquid-Crystal Spatial Light Modulator for Precise Phase Generation", In Proceedings of the Conference on Optoelectronic and Microelectronic Materials and Devices, Dec. 6, 2006, Perth, Australia, 5 pages.

Yang, D., "Review of operating principle and performance of polarizer-free reflective liquid-crystal displays", Journal of the Society for Information Display, vol. 16, Iss. 1, Jan. 2008, 3 pages.

Reichelt, S. et al., "Computational hologram synthesis and representation on spatial light modulators for real-time 3D holographic imaging", In Proceedings of the 9th International Symposium on Display Holography (ISDH 2012), Jun. 25, 2012, Cambridge, Massachusetts, USA, 10 pages.

Meneses-Fabian, C. et al., "Polarized light by quadrature amplitude modulation" Journal of Optics and Lasers in Engineering, vol. 51, Iss. 4, Apr. 2013, 2 pages.

Dunayevsky, J. et al., "MEMS Spatial Light Modulator for Phase and Amplitude Modulation of Spectrally Dispersed Light", Journal of Microelectromechanical Systems, vol. 22, No. 5, Oct. 2013, 9 pages.

Weng, L. et al., "High-efficiency and fast-switching field-induced tunable phase grating using polymer-stabilized in-plane switching liquid with vertical alignment", Journal of Physics D Applied Physics, vol. 49, No. 12, Feb. 23, 2016, 7 pages.

"Spatial Light Modulators" Holoeye Website, Retrieved Online at http://holoeye.com/spatial-light-moduators/, Dec. 11, 2016, 3 pages.

"Phase spatial light modulator LCOS-SLM", In Publication of Hamamatsu, Available as Early as Feb. 26, 2015, 14 pages.

"International Search Report & Written Opinion Issued in PCT Application No. PCT/US2018/020826", dated Jun. 25, 2018, 16 Pages.

* cited by examiner

HOLOGRAPHIC PHASE AND AMPLITUDE SPATIAL LIGHT MODULATION

BACKGROUND

Holographic displays create virtual three-dimensional images. Conventional liquid crystal devices are thought to be unsuitable for use as holographic devices because conventional liquid crystal displays do not independently modulate the phase and the amplitude of light.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A holographic display includes a pixel array including one or more pixels, a holographic data source, a drive array, and a light source. Each pixel includes a phase-modulating structure and an amplitude-modulating structure. The holographic data source is configured to supply a holographic drive signal. The holographic drive signal includes, for each pixel in each of a plurality of time-varying holographic image frames, a phase component defining phase modulation for the pixel and an amplitude component defining amplitude modulation for the pixel. The drive array is configured to, for each pixel in each holographic image frame, modulate the phase-modulating structure according to the phase component and modulate the amplitude-modulating structure according to the amplitude component. The light source is configured to output coherent light to illuminate the one or more pixels of the pixel array.

DETAILED DESCRIPTION

A dynamic hologram includes an interference pattern through which a light waveform is diffracted to produce an image holographically. In particular, the light waveform undergoes a transformation when emitted from the dynamic hologram according to an intensity and phase of the interference pattern. In one example, such a transformation is characterized by at least one Fourier Transform that defines both a hologram plane and an image plane as complex functions with phase and amplitude components. For example, a hologram can be represented mathematically as the product of two functions, one being a real positive function that defines the amplitude modulation, such as $A(x,y)$, and another function that contains only the phase information and has an amplitude of unity, such as $\exp(i*\varphi(x,y))$.

A liquid crystal (LC) device may serve as a dynamic hologram, because optical characteristics of the liquid crystal structure(s) can be manipulated to modulate either phase or amplitude of an incident light wavefront to achieve a desired Fourier Transform. However, in such an LC device the phase and amplitude parameters may be interlinked; i.e. for a given phase, the amplitude is fixed or vice versa. Given this limitation, a holographic LC device typically is configured to modulate only the phase of a light wavefront while the amplitude as a function of the phase remains constant (e.g., close to unity as possible).

For example, the phase distribution for the Fourier Transform(s) for an LC device to generate a phase-only hologram (i.e., a hologram where only phase can be modulated and amplitude is fixed) may be computed using a Hologram Design Algorithm (HDA), such as the Gerchberg-Saxton (GS) algorithm. The HDA may perform numerous iterations to determine the phase information while the amplitude approaches unity. However, even after performing numerous iterations and undergoing significant computational load, the amplitude does not converge completely to unity using such an approach. The inability of the hologram amplitude to converge to unity has two disadvantages. First, any residual amplitude modulation will introduce additional noise in the image resulting from the hologram. Second, computationally intensive algorithms are required to reduce the amplitude modulation in order to improve the image quality of the resulting image.

Accordingly, examples are disclosed that relate to a holographic display configured to modulate both phase and amplitude of a light wavefront that illuminates the holographic display. More particularly, the holographic display system includes a dynamic hologram in the form of a pixel array including one or more pixels. Each pixel includes a phase-modulating structure and an amplitude-modulating structure that are both modulated based on the pixel being driven with one or more holographic drive signals. Such modulation results in the pixels of the pixel array forming a hologram.

Because the pixels of the pixel array are configured to modulate both phase and amplitude, the holographic display can generate a hologram in a manner that is faster and less computationally intensive than the approach that generates a phase-only hologram as described above. Moreover, because the holographic display is configured to modulate both phase and amplitude, the resulting image may be reconstructed with lower noise than an image produced by the approach that generates the phase-only hologram.

Figure 1:
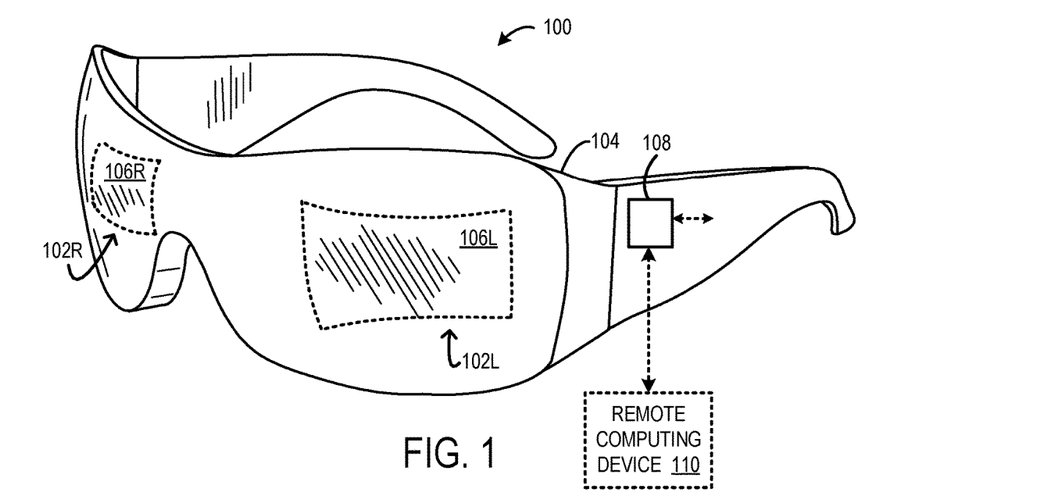
FIG. 1 shows an example near-eye display device.

FIG. 1 shows an example holographic display in the form of a near-eye display device 100. The display device 100 includes right-eye and left-eye holographic display systems 102R and 102L mounted to a frame 104 configured to rest on a wearer's head. Each of the right-eye and left-eye holographic display systems 102 include image display componentry configured to project computerized virtual imagery into left and right display windows 106R and 106L in the wearer's field of view (FOV). In one example, the light-deflecting image display componentry includes one or more holographic optical components. Different example holographic display systems representative of the right-eye and left-eye holographic display systems 102R and 102L are described in more detail below with reference to FIGS. 3, 4, and 7-9.

In some implementations, the right and left display windows 106R and 106L are wholly or partially transparent from the perspective of the wearer, to give the wearer a view of a surrounding environment. In other implementations, the right and left display windows 106R, 106L are opaque, such that the wearer is completely absorbed in virtual-reality (VR) imagery provided via the near-eye display device. In yet other implementations, the opacities of the right and/or left display windows 106R, 106L may be dynamically controlled via a dimming filter. A substantially see-through display window, accordingly, may be switched to full opacity for a fully immersive virtual-reality experience.

Display device 100 includes an on-board computing system 108 configured to render the computerized display imagery, which is provided to right and left display windows 106 via right-eye and left-eye holographic display systems 102. Computing system 108 is configured to send appropriate control signals to right display window 106R, thus causing the right display window to form a right display image. Likewise, the computing system 108 is configured to send appropriate control signals to left display window 106L, thus causing the left display window to form a left display image. The computing system 108 may include a logic subsystem and a storage subsystem, as discussed in more detail below with respect to FIG. 10. Operation of the display device 100 additionally or alternatively may be controlled by one or more remote computing device(s) 110 (e.g., in communication with display device 100 via a local area network and/or wide area network).

Figure 2:
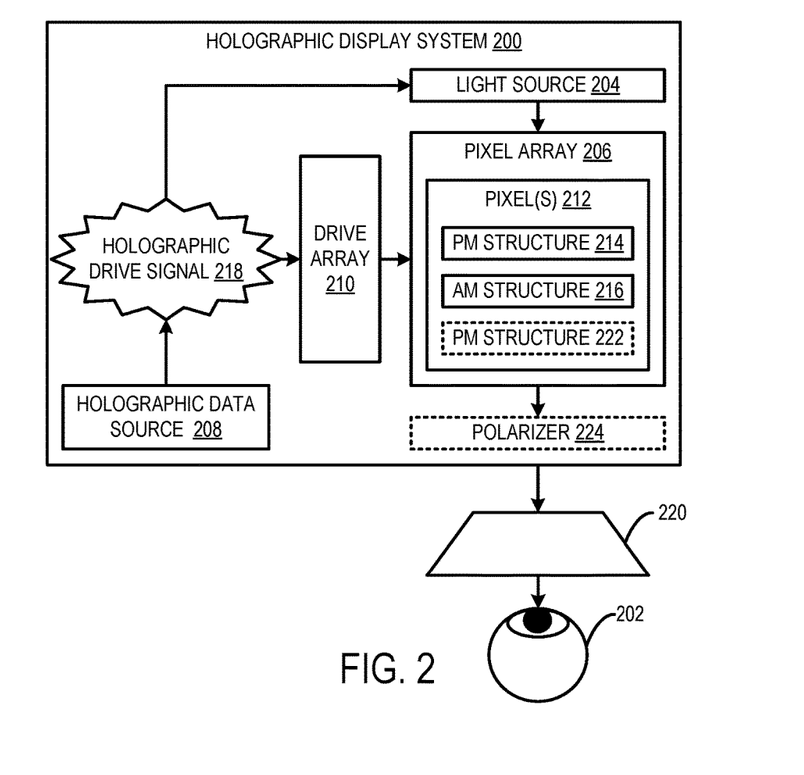
FIG. 2 shows an example holographic display system that may be implemented in a near-eye display device.

FIG. 2 schematically shows an example holographic display system 200 in simplified form. For example, the holographic display system 200 may be incorporated into a display device, such as near-eye display device 100 of FIG. 1. In particular, the holographic display system 200 may be representative of the right-eye or left-eye holographic display systems 102R and 102L of the display device 100 of FIG. 1. In another example, the holographic display system 200 may be incorporated into a computing system 1000 of FIG. 10. Generally, the holographic display system 200 may be incorporated into any suitable display device configured to direct coherent illumination light through a dynamic hologram to form an image. The holographic display system 200 includes a light source 204, a pixel array 206, a holographic data source 208, and a drive array 210.

The light source 204 is configured to output coherent light to illuminate one or more pixels 212 of the pixel array 206. In particular, the light source 204 is configured to emit coherent light wavefronts based on holographic drive signals received from the holographic data source 208. The coherent light emitted by the light source 204 may be directed to one or more pixels 212 of the pixel array 206 in any suitable manner. In one example, a coherent light wavefront is planar and normal to a direction of propagation with little or no beam divergence such that the coherent light wavefront uniformly illuminates the pixel array 206. In one example, the light source 204 is a laser configured to emit coherent light having uniform polarization and monochromaticity. In another example, light emitting diodes are used. The light source 204 may take any suitable form of light source that is configured to emit coherent light to illuminate the pixel array 206. In some implementations, one or more optical filters and/or other optical elements may be used to polarize/modulate/condition/direct the light on the way to the pixel array 206.

The pixel array 206 is an example of a dynamic hologram (e.g., a spatial light modulator) that forms a layer in an optical assembly of the holographic display system 200. The pixel array 206 includes one or more pixels 212 that may be manipulated to form a hologram. Depending on the implementation, the hologram may be transmissive or reflective. In some implementations, the pixels 212 may be arranged to form a two-dimensional (2D) hologram. In one example, the pixel array 206 includes a 2D array of 1024×1024 pixels. In some implementations, the pixels 212 may be arranged in an irregular array. In yet other implementations, the pixel array 206 may include a single pixel. The pixel array 206 may include any suitable number of pixels 212 arranged to form any suitable type of hologram.

Each pixel 212 includes one or more phase-modulating structures 214 and one or more amplitude-modulating structures 216. The phase-modulating structure 214 is configured to selectively modulate the phase of a light wavefront that passes through the phase-modulating structure 214. The phase-modulating structure 214 may be configured to modulate the phase of a light wavefront to any suitable phase within a phase range. In one example, the phase-modulating structure 214 is configured to selectively modulate the phase of a light wavefront to any phase within a phase range of 0 to $2\pi$.

The amplitude-modulating structure 216 is configured to selectively modulate the amplitude of a light wavefront that passes through the amplitude-modulating structure 216. The amplitude-modulating structure 216 may be configured to modulate the amplitude of a light wavefront to any suitable amplitude within an amplitude range. In one example, the amplitude-modulating structure 216 is configured to selectively modulate the amplitude of a light wavefront to any amplitude within an amplitude range of 65% to 100%. In some implementations in which the amplitude-modulating structure is configured to modulate less than a full amplitude range (i.e., less range than 0% to 100%), the phase-modulating structure may be configured to modulate the full phase range (i.e., 0 to $2\pi$).

Even with a limited range of amplitude modulation, a suitable hologram may be formed by the pixel array 206. Unlike a conventional display where between 0% and 100% transmittance is required, in a hologram, good image quality may be achieved with 65% to 100% modulation. Using appropriate hologram design algorithms, the range of amplitude modulation can be reduced to produce a hologram with very little noise. Moreover, the limited range of amplitude modulation allows for reduced computational demand.

In some implementations, the phase-modulating structure 214 and the amplitude-modulating structure 216 may be separate physical structures. In other implementations, the phase-modulating structure 214 and the amplitude-modulating structure 216 may be the same physical structure. Example pixels including phase-modulating structures and/or amplitude-modulating structures are show in FIGS. 3A, 3B, 4, 7, 8A, 8B, and 9 discussed in further detail below.

The holographic data source 208 is configured to supply a holographic drive signal 218 to the light source 204 and the drive array 210. The aspect of the holographic drive signal 218 supplied to drive array 210 defines a hologram to be formed by the pixel array 206 for a given image frame. The aspect of the holographic drive signal 218 supplied to light source 204 indicates when to emit a light pulse to illuminate the pixel array 206 with a light wavefront.

The holographic drive signal 218 includes, for each pixel, during each of a plurality of time-varying holographic image frames, a phase component defining phase modulation for the pixel and an amplitude component defining amplitude modulation for the pixel. In one example, the phase component of the holographic drive signal 218 may be represented as an argument of a complex function having values that are complex numbers including real and imaginary parts. The amplitude component may be represented as the modulus of that same complex function. For example, the complex functions may be computed by the holographic data source 208 as Fourier Transforms to determine the phase component and the amplitude component. In one example, the holographic data source 208 may be configured to compute and output a holographic drive signal 218 for each image frame of the plurality of time-varying image frames, thus producing a video of holographic images.

The holographic drive signal 218 may take any suitable form. In some implementations, the holographic drive signal 218 may include a step signal. In some implementations, the holographic drive signal 218 may include a pulse width modulated (PWM) signal. In some implementations, the holographic drive signal 218 has one frequency. In other implementations, the holographic drive signal 218 has two or more different frequencies.

The drive array 210 includes a plurality of electrodes configured to translate the drive signal into corresponding pixel activations in the pixel array 206. Each pixel 212 may include any suitable number of corresponding electrodes of the drive array 210. In one example, each pixel includes a front electrode and a rear electrode. In another example, each pixel includes a front electrode and two or more interdigitated rear electrodes. The electrodes of the drive array 210 may include any suitable material. In one example, the electrodes are made of indium tin oxide (ITO). The electrodes of the drive array 210 are driven to modulate the phase-modulating structure 214 and/or the amplitude-modulating structure 216 of each pixel based on the holographic drive signal 218. In particular, the drive array 210 is configured to, for each pixel, during each holographic image frame, modulate the phase-modulating structure 214 according to the phase component of the holographic drive signal 218 and modulate the amplitude-modulating structure 216 according to the amplitude component of the holographic drive signal 218.

When the pixel array 206 is illuminated with a light wavefront emitted from the light source 204, the phase and amplitude of the light wavefront is modulated by the phase-modulating structures 214 and/or the amplitude-modulating structures 216 of the different pixels 212 of the pixel array 206. Such phase and amplitude modulation of the light wavefront results in reconstruction/projection of a holographic image 220 that is output from the holographic display system 200 to the user's eye 202. The holographic image 220 output from the holographic display system 200 may take any suitable form. In one example, the holographic image 220 is a 2D image that is projected onto an optical display element (e.g., a lens).

In some implementations, each pixel 212 of the pixel array 206 may include one or more polarization-modulating structures 222 instead of (or in addition to) the amplitude-modulating structure 216. The polarization-modulating structure 222 may be configured to modulate the polarization of a light wavefront that illuminates the pixel. The polarization-modulating structure 222 may modulate the light wavefront based on a polarization component of the holographic drive signal 218 produced by the holographic data source 208.

In such implementations, light wavefronts that illuminate the pixel array 206 may have a designated polarization based on the design of the holographic display system 200 such that the polarization-modulating structure 222 can modulate the polarization of the light wavefronts accurately. The polarization of the light wavefronts provided to the pixel array 206 may have any suitable polarization. In one example, the light source 204 may emit illumination light having the designated polarization. In another example, a polarizer layer may be positioned intermediate the light source 204 and the pixel array 206, such that the polarizer layer modulates the polarization of the illumination light emitted by the light source 204 to the designated polarization. In one example, the illumination light is linearly polarized when it illuminates the pixel array 206.

Furthermore, in implementations where pixels 212 of the pixel array 206 include the polarization-modulating structure 222, the holographic display system 200 optionally may include a polarizer layer 224 positioned intermediate the pixel array 206 and an output of the holographic display system 200. The polarizer layer 224 may be configured to modulate the polarization of light wavefronts output from the pixel array 206. The combination of the polarization modulation performed by the polarization-modulating structure 222 and the polarization modulation performed by the polarizer layer 224 effectively translate the polarization modulation into amplitude modulation of the light wavefronts output by the holographic display system 200.

The holographic display system 200 is provided as an example and is meant to be non-limiting. Although the holographic display system 200 is discussed in the context of a near-eye display device, concepts disclosed herein are broadly applicable to any suitable type of holographic display. For example, such holographic displays may be configured to project a holographic image onto a screen, into an eye, into a waveguide, or may be a part of a larger optical system.

Figure 3A:
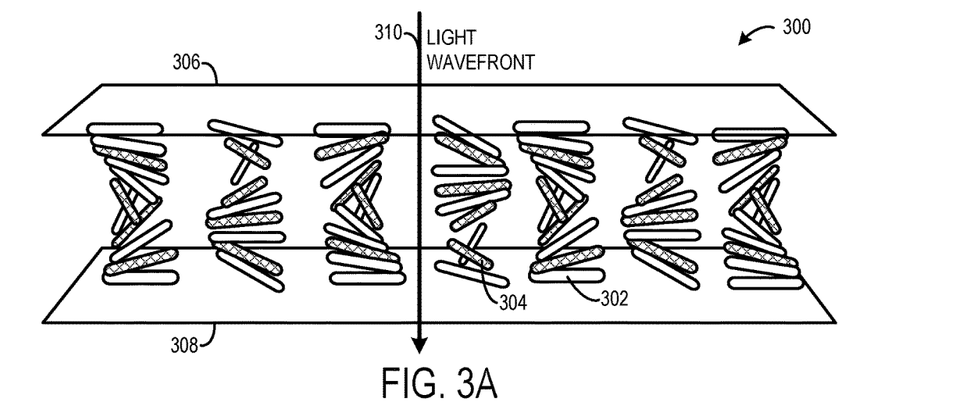
FIGS. 3A and 3B show a pixel of an example dynamic hologram that includes a phase-modulating structure and an amplitude-modulating structure.
Figure 3B:
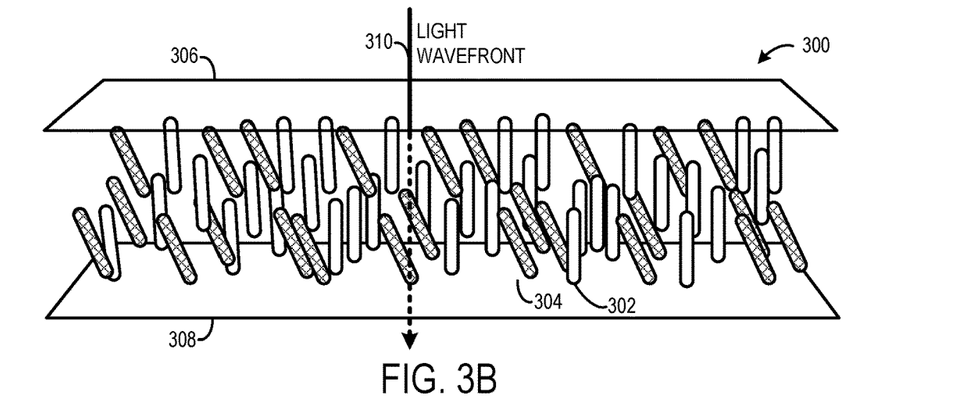

In some implementations, the pixel array 206 of the holographic display system 200 may be implemented using a liquid crystal device that serves as a dynamic hologram. FIGS. 3A and 3B show a cell/pixel 300 of an example liquid crystal device. The pixel 300 includes a mixture of 1) a plurality of phase-modulating structures in the form of liquid crystal host structures 302, and 2) amplitude-modulating structures in the form of dye guest structures 304. The liquid crystal host structures 302 and the dye guest structures are contained between a light input layer 306 and a light output layer 308.

Both the liquid crystal host structures 302 and the dye guest structures 304 are configured to change orientation within the pixel 300 in the presence of an applied voltage, such as a voltage provided by the drive array 210 of FIG. 2.

Further, both the liquid crystal host structures 302 and the dye guest structures 304 are configured to change a polarization state (and hence phase) of a light wavefront 310 based on the particular orientation of the structures in the pixel 300. However, the liquid crystal host structures 302 and the dye guest structures 304 are configured to change orientation differently based on the applied voltage. The manner in which the different structures change orientation may be based on a variety of factors including a shape of the structures and a moment of inertia and/or dipole moment of the structures in the pixel. In the illustrated example, the liquid crystal host structures 302 are nematic and "rod" shaped. Likewise, the dye guest structures 304 are morphologically similar.

In FIG. 3A, when the pixel 300 is in an OFF state (e.g., no voltage is applied to the pixel 300), the liquid crystal host structures 302 and the dye guest structures 304 assume a twisted helical formation that allows the light wavefront 310 to pass through the pixel 300 without modulating the phase and the amplitude of the light wavefront 310.

In FIG. 3B, when the pixel 300 is in an ON state (e.g., when a voltage based on the holographic drive signal 218 of FIG. 2 is applied to the pixel 300), the liquid crystal host structures 302 and the dye guest structures 304 change orientation to align vertically to modulate the phase and amplitude of the light wavefront 310. In particular, the liquid crystal host structures 302 modulate the phase of the light wavefront 310, and the dye guest structures 304 modulate the amplitude of the light wavefront 310. In this example, since the two structures are morphologically similar, the liquid crystal host structures 302 and the dye guest structures 304 change orientation differently based on the different moments of inertia and/or dipole moments of the two structures in the pixel 300. In particular, the dye guest structures 304 have a rotational response that temporally lags or leads relative to a rotational response of the liquid crystal host structures 302. In other words, the dye guest structures 304 have a larger time constant than that of the liquid crystal host structures 302. In the illustrated example, the liquid crystal host structures 302 have rotated to a vertical position and the dye guest structures 304 are lagging 30 degrees behind.

This temporal relationship between the liquid crystal host structures 302 and the dye guest structures 304 may be leveraged to control a timing of when the holographic drive signal is applied to the pixel 300. In particular, each pixel activation may be timed to produce a desired rotation of the liquid crystal host structures 302 and the dye guest structures 304 when the light wavefront 310 is applied to the pixel. In this way, the phase and amplitude of the light wavefront 310 can be modulated as desired.

Figure 4:
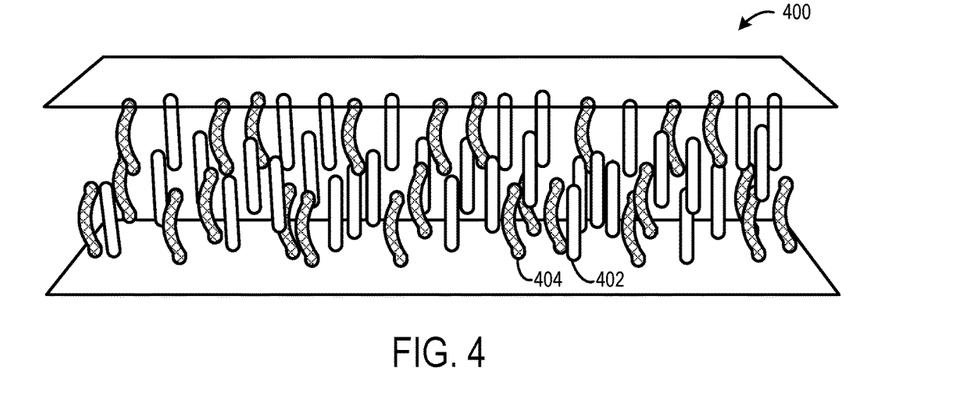
FIG. 4 shows a pixel of another example dynamic hologram including a phase-modulating structure and an amplitude-modulating structure that has a different shape than the phase-modulating structure.

In another example shown in FIG. 4, a pixel 400 includes a plurality of liquid crystal host structures 402 and a plurality of dye guest structures 404 that differ in shape. In particular, the liquid crystal host structures 402 are "rod" shaped, and the dye guest structures 404 are curved and have a "banana" shape. The morphological differences between the two structures result in the dye guest structures 404 having a larger time constant than the time constant of the liquid crystal host structures 402. Moreover, the relative difference in time constants between the structures of the pixel 400 is greater than the relative difference in time constants between the structures of the pixel 300.

The liquid crystal host structures 302 and the dye guest structures 304 may be configured to have any suitable time constants based at least in part on a molecular shape and/or moment of inertia and/or dipole moment of the different structures to provide any suitable range of phase and amplitude modulation. For example, the different structures may be disk shaped, rod shaped, banana shaped, or spherical, among other shapes. Note that the orientation/rotation time constants of the structures also may be influenced by an electron charge distribution on the structures in the pixel and/or various intermolecular forces. Although the time constant of the amplitude-modulating structure is described as being greater than the time constant of the phase-modulating structure, in some implementations, the time constant of the phase-modulating structure may be greater than the time constant of the amplitude-modulating structure.

In some implementations, the pixels of the pixel array may have other structural arrangements. For example, the pixels may include blue phase material, ferroelectric material, or another material.

The phase and amplitude modulation of a pixel may factor in a predicted state of the pixel at the time the holographic drive signal is applied. For example, when it is time to apply the holographic drive signal, the different modulation structures may not have fully returned to an off orientation after rotation resulting from modulation during a previous holographic image frame. As such, the holographic drive signal may account for past rotation such that the modulation structures will have a desired rotation when the wavefront 310 is applied to the pixel.

Figure 5:
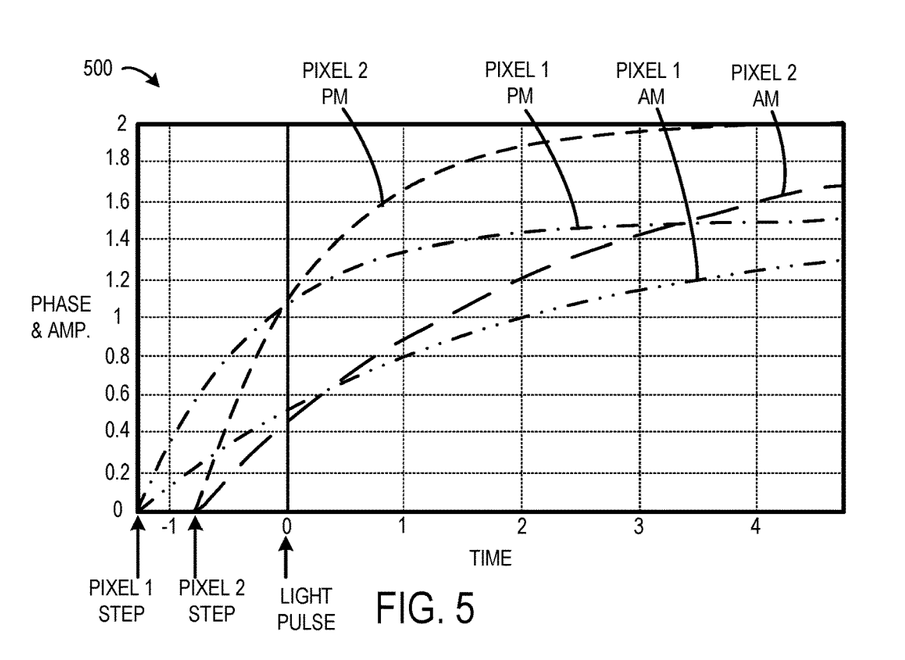
FIG. 5 shows a graph indicting how step signals are used to appropriately modulate the phase-modulating structure and the amplitude-modulating structure of different pixels.
Figure 6:
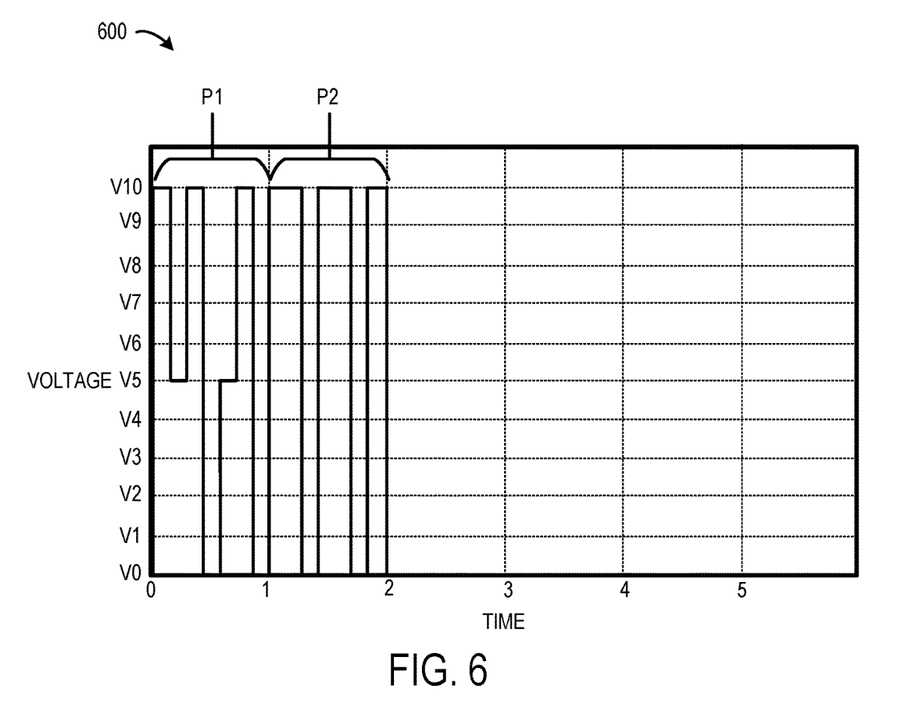
FIG. 6 shows a graph indicating how pulse-width-modulating (PWM) signals are used to appropriately modulate the phase-modulating structure and the amplitude-modulating structure of different pixels.

Different types of signals may be used to drive the pixels 212 of the pixel array 206 of FIG. 2 such that the phase-modulating structure 214 and the amplitude-modulating structure 216 of each pixel appropriately modulate the phase and amplitude of a light wavefront that illuminates the pixels. FIGS. 5 and 6 show graphs of different example drive signals that may be used to drive different pixels to modulate phase and amplitude of light wavefronts that illuminate the pixels.

In FIG. 5, different pixels of the pixel array are driven with step signals at different times prior to a light wavefront illuminating the pixel array. The timing of when the step signals are applied to the different pixels is derived from the relationship of the different time constants of the amplitude-modulating structures and the phase-modulating structures. In particular, the delayed rotation of the amplitude-modulating structures (e.g., the dye guest structures) relative to the phase-modulating structures (e.g., the liquid crystal host structures) is factored into the timing determination such that the different modulating structures are rotated to the appropriate orientation to produce the phase component and the amplitude component of the holographic drive signal when the pixel is illuminated by the light wavefront.

In the illustrated example, at time 0, the pixels of the pixel array are illuminated with the light wavefront. At time −1.3, a first pixel is driven with a first step signal of voltage V1. The particular timing of the first step signal allows the phase-modulating structures and the amplitude-modulating structures of the first pixel to rotate according to their respective time constants to achieve the particular phase and amplitude modulation of the holographic drive signal for the first pixel when the light wavefront illuminates the first pixel at time 0. In particular, the phase-modulating structures rotate to produce a phase modulation of 1.1, and the amplitude-modulating structures rotate to produce an amplitude modulation of 0.5.

Furthermore, at time −0.8, a second pixel is driven with a second step signal with voltage V2. The particular timing of the second step signal allows the phase-modulating structures and the amplitude-modulating structures of the second pixel to rotate according to their respective time constants to achieve the particular phase and amplitude modulation of the holographic drive signal for the second pixel when the light wavefront illuminates the second pixel at time 0. In particular, the phase-modulating structures rotate to produce a phase modulation of 1.1, and the amplitude-modulating structures rotate to produce an amplitude modulation of 0.45.

In the illustrated example, the phase modulation is the same for both the first and second pixels. However, the amplitude modulation is different. The time delay between switching on the pixels (0.5 ms) allows for the different levels of amplitude modulation to be achieved since the time constants of the amplitude-modulating structures are the same for both pixels. The illustrated step signals are meant to be non-limiting. It will be appreciated that a step signal may be applied to a pixel at any suitable time to achieve any suitable phase modulation and amplitude modulation of a light wavefront that illuminates the pixel.

More complex waveforms can be used to drive a pixel, including pulse width modulation schemes optimized to take advantage of the different time constants of different modulation structures. In such an approach, pulses can be used in succession to push the phase modulation in one direction and the amplitude modulation in another direction.

For example, in FIG. 6, a pixel of the pixel array is driven with a pulse-width-modulated (PWM) signal. In particular, the PWM signal includes a first set of pulses (P1) that collectively have a higher frequency and a second set of pulses (P2) that collectively have a lower frequency. The phase-modulating structures of the pixel respond to the higher frequency portion P1 of the PWM signal by rotating to a position corresponding to the phase component. The amplitude-modulating structures of the pixel respond to the lower frequency portion P2 of the PWM signal by rotating to a position corresponding to the amplitude component. The frequency and/or duty cycle of the PWM signal may be adjusted to achieve any suitable phase and/or amplitude modulation for the pixel.

The pixel 300 of FIG. 3 includes a mixture of two distinct host and guest materials that separately modulate phase and amplitude of a light wavefront that illuminates the pixel 300. In some implementations, a pixel array may include pixels that have a single material or single type of modulation structure that exhibits different phase and amplitude modulation capabilities under different conditions.

Figure 7:
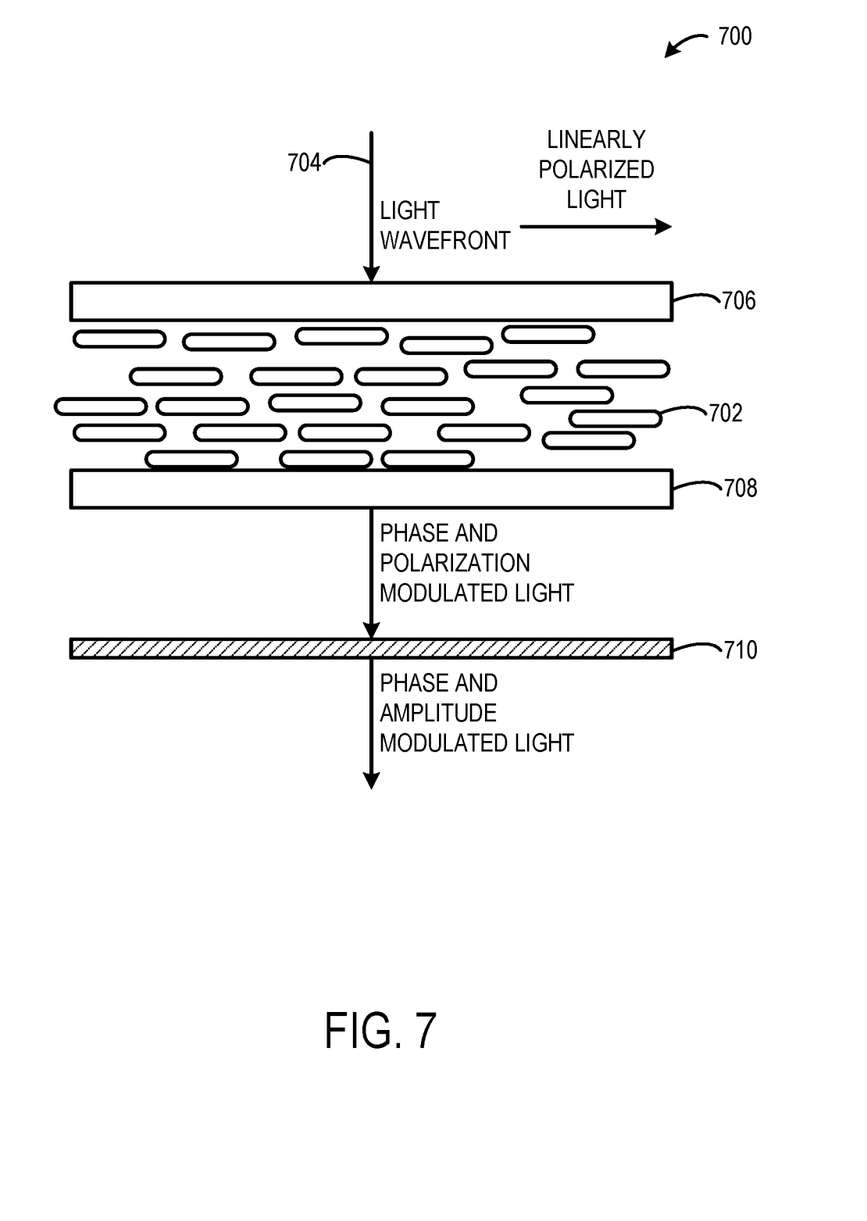
FIG. 7 shows a pixel of another example dynamic hologram including a modulation structure configured to rotate about two different axes to modulate phase and amplitude.
Figure 8A:
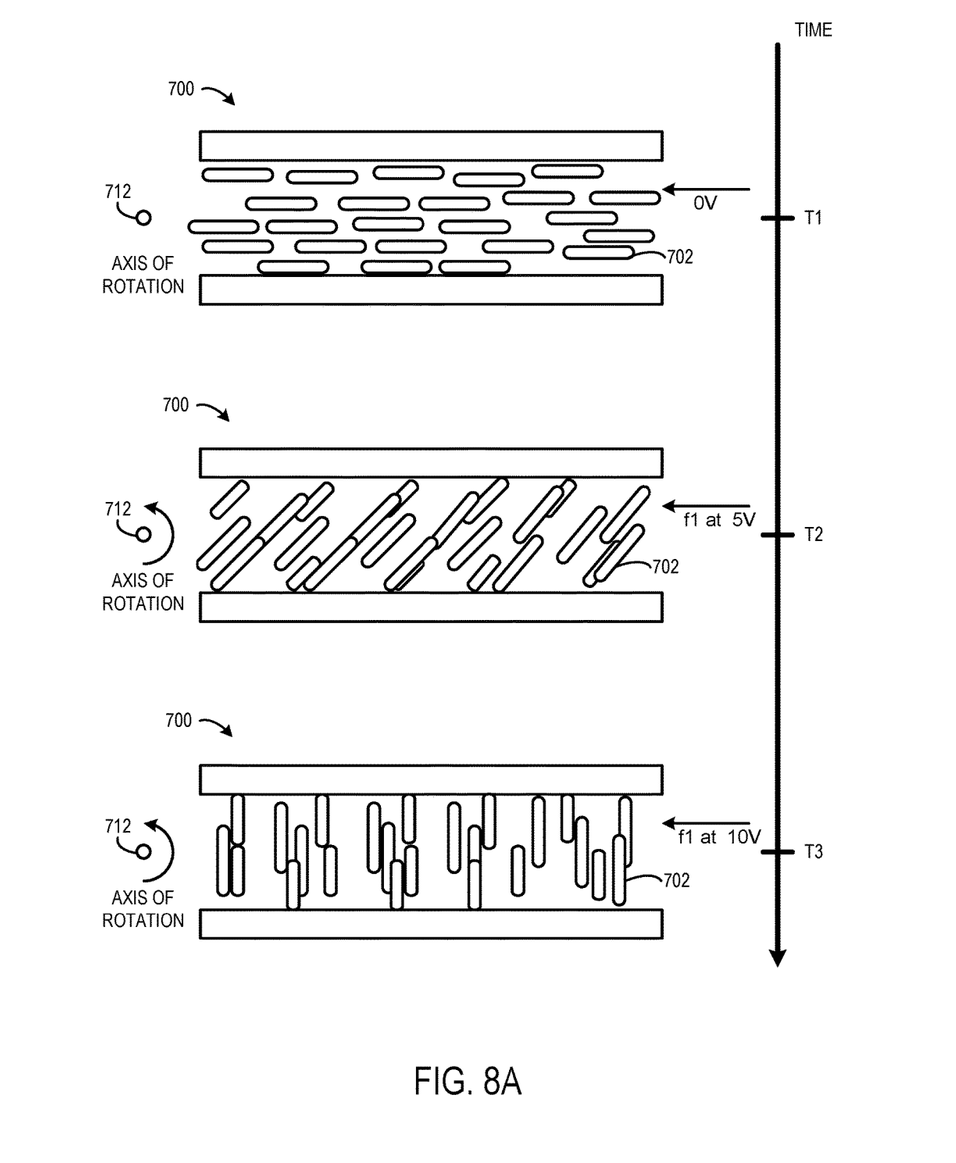
FIG. 8A shows the modulation structure of the pixel of FIG. 7 rotating about a first axis based on a control signal at a first frequency being applied to the pixel.
Figure 8B:
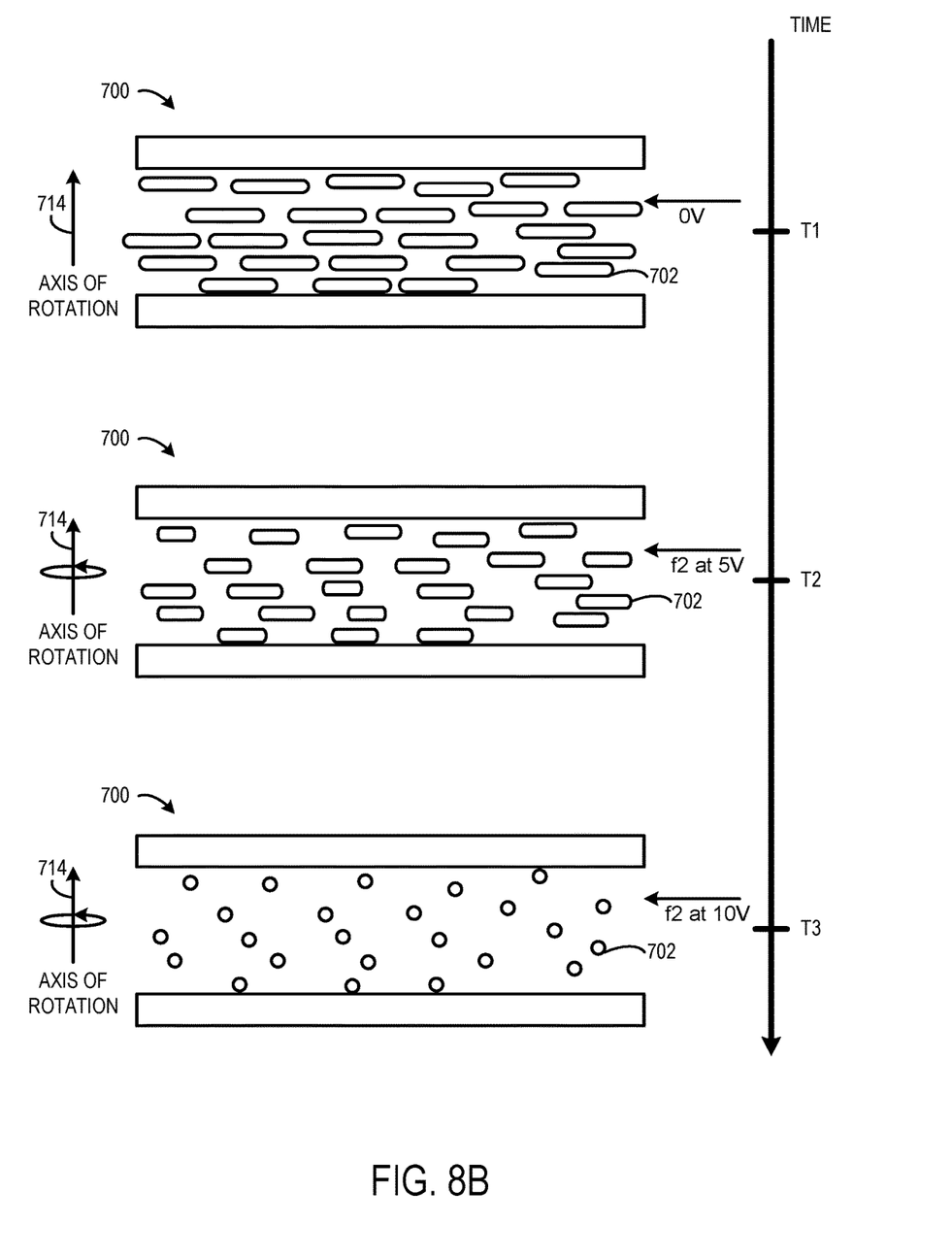
FIG. 8B shows the modulation structure of the pixel of FIG. 7 rotating about a second axis based on a control signal at a second frequency being applied to the pixel.

FIGS. 7, 8A, and 8B show an example pixel 700 that includes a plurality of modulation structures 702 that are all the same type. The modulation structures 702 are configured to modulate both phase and amplitude of a light wavefront 704 that illuminates the pixel 700. The modulation structures 702 are between a light input layer 706 and a light output layer 708. The modulation structures 702 are configured to rotate about two different axes based on the pixel 700 being driven with different drive signals. Rotation of the modulation structures 702 about the first axis produces phase modulation. Rotation of the modulation structures 702 about the second axis produces polarization modulation.

In this implementation, since the modulation structures 702 are configured to modulate polarization, the incoming light wavefront 704 has a particular polarization (e.g., linearly polarized) that is designated for this configuration. The pixel 700 further includes a polarizer layer 710 positioned on a light output side of the pixel 700, downstream from the light output layer 708. The polarizer layer 710 is configured to translate the polarization modulation of the light wavefront 704 that is output from the light output layer 708 into amplitude modulation. Accordingly, the light wavefront 704 that is output from the polarizer layer 710 can be modulated in both phase and amplitude.

The modulation structures 702 may be configured to rotate about any two different axes to modulate phase and polarization. For example, the two axes may be orthogonal to one another. In one example, the modulation structures 702 are configured to rotate about a first axis that is parallel to a plane of the pixel array/device and further rotate about a second axis that is perpendicular to the plane of the pixel array/device.

Furthermore, the holographic drive signal that causes rotation of the modulation structures 702 may vary in different ways. In one example, the holographic drive signal may have two or more frequencies that cause the modulation structures 702 to rotate about different axes.

FIGS. 8A and 8B show an example scenario in which the modulation structures 702 rotate about two different axes based on a holographic drive signal having two different frequencies being applied to the pixel 700. In this example, the modulation structures 702 are "slat" shaped. In FIG. 8A, at time T1, the pixel 700 is in an OFF state (e.g., no voltage is applied to the pixel), and the modulation structures 702 are aligned with an axis 712 that is parallel with a plane of the pixel 700. At time T2, a holographic drive signal having an amplitude of 5 volts is applied at a first frequency to the pixel 700. The drive signal having the first frequency causes the modulation structures 702 to partially rotate (e.g., 45°) about the axis 712. At time T3, the amplitude of the holographic drive signal increases to 10 volts while maintaining the first frequency, and the modulation structures 702 rotate further (e.g., 90°) about the axis 712.

In FIG. 8B, at time T1, the pixel 700 is in an OFF state (e.g., no voltage is applied to the pixel), and the modulation structures are aligned with an axis 714 that is perpendicular to a plane of the pixel 700. At time T2, a holographic drive signal having an amplitude of 5 volts is applied at a second frequency to the pixel 700. The drive signal having the second frequency causes the modulation structures 702 to partially rotate (e.g., 45°) about the axis 714, which is perpendicular to axis 712 from FIG. 8A. At time T3, the amplitude of the holographic drive signal increases to 10 volts while maintaining the second frequency, and the modulation structures 702 rotate further (e.g., 90°) about the axis 714. According to the illustrated examples, the holographic drive signal having different frequencies may be applied to the pixel 700 to produce any suitable ranges of phase and/or polarization (amplitude) modulation as specified by the phase component and the amplitude component of the holographic drive signal. A holographic drive signal having components of the first frequency and the second frequency can be used to produce both phase and amplitude modulation.

Figure 9:
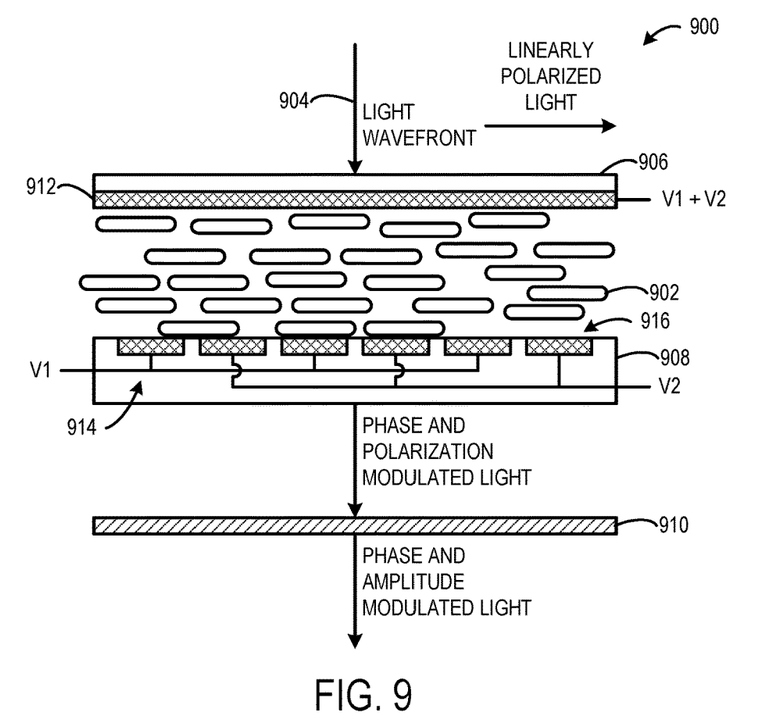
FIG. 9 shows a pixel of another example dynamic hologram including a modulation structure and a pair of interdigitated electrodes that are driven to rotate the modulation structure about two different axes to modulate phase and amplitude.

FIG. 9 shows another example pixel 900 that includes at least two interdigitated electrodes 914 and 916 configured to apply different voltages that cause rotation of a single type of modulation structures 902 about two different axes to modulate both phase and polarization of a light wavefront 904. The modulation structures 902 are between a light input layer 906 and a light output layer 908. The modulation structures 902 are configured to rotate about two different axes based on the pixel 900 being driven with different voltages. Rotation of the modulation structures 902 about the first axis produces phase modulation. Rotation of the modulation structures 902 about the second axis produces polarization modulation. In this implementation, since the modulation structures 902 are configured to modulate polarization, the incoming light wavefront 904 has a polarization (e.g., linearly polarized) that is designated for this particular configuration. The pixel 900 further includes a polarizer layer 910 positioned on a light output side of the pixel 900, downstream from the light output layer 908. The polarizer layer 910 is configured to translate the polarization modulation of the light wavefront 904 that is output from the light output layer 908 into amplitude modulation. Accordingly, the light wavefront 904 that is output from the polarizer layer 910 can be modulated in both phase and amplitude.

Furthermore, the light input layer 906 includes a light input side electrode 912. The light output layer 908 includes the two interdigitated electrodes 914 and 916. In particular, the interdigitated electrodes 914 and 916 may be examples of a plurality of interdigitated electrodes that alternate throughout the light output layer 908. The first interdigitated electrode 914 is configured to apply a first voltage (V1) to the pixel 900. The second interdigitated electrode 916 is configured to apply a second voltage (V2) to the pixel 900. The light input side electrode 912 is configured to apply a voltage that is a sum of the first voltage (V1) and the second voltage (V2). The modulation structures 902 that are proximate to the light input layer 906 respond to the voltage that is the sum of the voltages V1+V2 provided by the light input side electrode 912 by rotating about a first axis (e.g., parallel to a plane of the pixel 900). Such rotation modulates the phase of the light wavefront 904. Further, the modulation structures 902 that are proximate to the light output layer 908 respond to a voltage that is the difference between the voltages (V1–V2) provided by the interdigitated electrodes 914 and 916 by rotating about a second axis (e.g., perpendicular to the plane of the pixel 900). Such rotation modulates the polarization of the light wavefront 904, which is translated to amplitude modulation by the polarizer layer 910.

Accordingly, a pixel array, such as a liquid crystal device, including interdigitated electrodes may be used to modulate phase and/or amplitude in order to generate a hologram.

Figure 10:
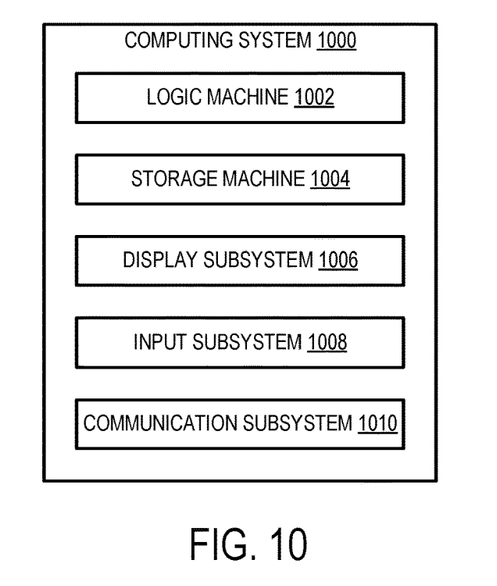
FIG. 10 shows an example computing system.

FIG. 10 schematically shows a non-limiting implementation of a computing system 1000 that can be configured as a holographic display, such as the display device 100 of FIG. 1. Computing system 1000 is shown in simplified form. Computing system 1000 may take the form of one or more holographic projection devices, near-eye display devices, head-mounted computing devices, personal computers, server computers, tablet computers, home-entertainment computers, network computing devices, gaming devices, mobile computing devices, mobile communication devices (e.g., smart phone), and/or other computing devices.

Computing system 1000 includes a logic machine 1002 and a storage machine 1004. Computing system 1000 may optionally include a display subsystem 1006, input subsystem 1008, communication subsystem 1010, and/or other components not shown in FIG. 1000.

Logic machine 1002 includes one or more physical devices configured to execute instructions. For example, the logic machine 1002 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 1002 may include one or more processors configured to execute software instructions. Additionally or alternatively, the logic machine 1002 may include one or more hardware or firmware logic machines configured to execute hardware or firmware instructions. Processors of the logic machine 1002 may be single-core or multi-core, and the instructions executed thereon may be configured for sequential, parallel, and/or distributed processing. Individual components of the logic machine 1002 optionally may be distributed among two or more separate devices, which may be remotely located and/or configured for coordinated processing. Aspects of the logic machine 1002 may be virtualized and executed by remotely accessible, networked computing devices configured in a cloud-computing configuration.

Storage machine 1004 includes one or more physical devices configured to hold instructions executable by the logic machine 1002 to implement the methods and processes described herein. When such methods and processes are implemented, the state of storage machine 1004 may be transformed—e.g., to hold different data.

Storage machine 1004 may include removable and/or built-in devices. Storage machine 1004 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1004 may include volatile, nonvolatile, dynamic, static, read/write, read-only, random-access, sequential-access, location-addressable, file-addressable, and/or content-addressable devices.

It will be appreciated that storage machine 1004 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1002 and storage machine 1004 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1006 may be used to present a visual representation of data held by storage machine 1004. This visual representation may take the form of a graphical user interface (GUI). As the herein described methods and processes change the data held by the storage machine 1004, and thus transform the state of the storage machine 1004, the state of display subsystem 1006 may likewise be transformed to visually represent changes in the underlying data. Display subsystem 1006 may include one or more display devices utilizing virtually any type of technology. Such display devices may be combined with logic machine 1002 and/or storage machine 1004 in a shared enclosure, or such display devices may be peripheral display devices.

When included, input subsystem 1008 may comprise or interface with one or more user-input devices such as a keyboard, mouse, touch screen, or game controller. In some implementations, the input subsystem 1008 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1010 may be configured to communicatively couple computing system 1000 with one or more other computing devices. Communication subsystem 1010 may include wired and/or wireless communication devices compatible with one or more different communication protocols. As non-limiting examples, the communication subsystem 1010 may be configured for communication via a wireless telephone network, or a wired or wireless local- or wide-area network. In some implementations, the communication subsystem 1010 may allow computing system 1000 to send and/or receive messages to and/or from other devices via a network such as the Internet.

In an example, a holographic display comprises a pixel array including one or more pixels, each pixel including a liquid crystal host structure and a dye guest structure mixed with the liquid crystal host structure, a holographic data source configured to supply a holographic drive signal, the holographic drive signal including, for each pixel in each of a plurality of time-varying holographic image frames, a phase component defining phase modulation for the pixel and an amplitude component defining amplitude modulation for the pixel, a drive array configured to, for each pixel, during each holographic image frame, modulate the liquid crystal host structure according to the phase component and modulate the dye guest structure according to the amplitude component, and a light source configured to output coherent light to illuminate the one or more pixels of the pixel array. In this example and/or other examples, the liquid crystal host structure may differ in shape from the dye guest structure. In this example and/or other examples, the dye guest structure may have a rotational response that temporally lags or leads relative to a rotational response of the liquid crystal host structure. In this example and/or other examples, the drive array may be configured to, for each pixel of the pixel array, provide a drive signal to the pixel at a time prior to the light source illuminating the pixel. The time derived from the phase component may be based on the relationship of the rotational response of the dye guest structure relative to the rotational response of the liquid crystal host structure such that a delayed rotation of the dye guest structure relative to the liquid crystal host structure produces the phase modulation and the amplitude modulation when the pixel is illuminated by the light source. In this example and/or other examples, the phase component of the holographic drive signal may be represented as an argument of a complex function, and the amplitude component of the holographic drive signal may be represented as a modulus of the complex function. In this example and/or other examples, the drive array may be configured to, for each pixel of the pixel array, drive the pixel with a step signal to modulate the liquid crystal host structure and the dye guest structure of the pixel. In this example and/or other examples, the drive array may be configured to, for each pixel of the pixel array, drive the pixel with a pulse-width-modulated (PWM) signal to modulate the liquid crystal host structure and the dye guest structure of the pixel. The PWM signal may include a first set of pulses configured to modulate the liquid crystal host structure and a second set of pulses configured to modulate the dye guest structure. In this example and/or other examples, the drive array may be configured to, for each pixel of the pixel array, drive the pixel with a drive signal having two or more frequencies. At least one of the two or more frequencies may be configured to modulate the liquid crystal host structure of the pixel. At least one of the two or more frequencies may be configured to modulate the dye guest structure of the pixel.

In an example, a holographic display, comprises a pixel array including one or more pixels, each pixel including a phase-modulating structure and an amplitude-modulating structure, a holographic data source configured to supply a holographic drive signal, the holographic drive signal including, for each pixel in each of a plurality of time-varying holographic image frames, a phase component defining phase modulation for the pixel and an amplitude component defining amplitude modulation for the pixel, a drive array configured to, for each pixel in each holographic image frame, modulate the phase-modulating structure according to the phase component and modulate the amplitude-modulating structure according to the amplitude component, and a light source configured to output coherent light to illuminate the one or more pixels of the pixel array. In this example and/or other examples, the phase component may provide a full range of phase modulation, and the amplitude component may be provide a limited range that is less than a full range of amplitude modulation. In this example and/or other examples, the phase-modulating structure may include a liquid crystal host structure, and the amplitude-modulating structures may include a dye guest structure mixed with the liquid crystal host structure. In this example and/or other examples, the liquid crystal host structure differs in shape from the dye guest structure. In this example and/or other examples, the amplitude-modulating structure may have a rotational response that temporally lags or leads relative to a rotational response of the phase-modulating structure. In this example and/or other examples, the drive array may be configured to, for each pixel of the pixel array, provide a drive signal to the pixel at a time prior to the light source illuminating the pixel based on the holographic drive signal. The time may be derived from the phase component based on the relationship of the rotational response of the amplitude-modulating structure relative to the rotational response of the phase-modulating structure such that a delayed rotation of the amplitude-modulating structure relative to the phase-modulating structure produces the phase modulation and the amplitude modulation when the pixel is illuminated by the light source. In this example and/or other examples, the phase component of the holographic drive signal may be represented as an argument of a complex function, and the amplitude component of the holographic drive signal may be represented as a modulus of the complex function. In this example and/or other examples, the drive array may be configured to, for each pixel of the pixel array, drive the pixel with a step signal to modulate the phase-modulating structure and the amplitude-modulating structure of the pixel. In this example and/or other examples, the drive array may be configured to, for each pixel of the pixel array, drive the pixel with a pulse-width-modulated (PWM) signal to modulate the phase-modulating structure and the amplitude-modulating structure of the pixel. The PWM signal may include a first set of pulses configured to modulate the phase-modulating structure and a second set of pulses configured to modulate the amplitude-modulating structure. In this example and/or other examples, the drive array may be configured to, for each pixel of the pixel array, drive the pixel with a drive signal having two or more frequencies. At least one of the two or more frequencies may be configured to modulate the phase-modulating structure of the pixel. At least one of the two or more frequencies may be configured to modulate the amplitude modulating structure of the pixel. In this example and/or other examples, each pixel may include a plurality of modulation structures. Each modulation structure may serve as both the phase-modulating structure and the amplitude-modulating structure. The pixel array may include, for each of the one or more pixels, an input side electrode positioned on a light-input side of the pixel and a plurality of interdigitated electrodes, including a first interdigitated electrode and a second interdigitated electrode, positioned on a light-output side of the pixel. The holographic data source may be configured to supply the holographic drive signal with a polarization component defining, for each pixel, during each of the plurality of time-varying holographic image frames, polarization modulation for the pixel. The drive array may be configured to, for each pixel, during each holographic image frame: modulate a first subset of the plurality of modulation structures positioned proximate to the plurality of interdigitated electrodes according to the polarization component while driving the first interdigitated electrode with a first voltage and the second interdigitated electrode with a second voltage such that the first subset of modulation structures rotate in a first direction, and modulate a second subset of the plurality of modulation structures positioned proximate to the input side electrode according to the phase component while driving the input side electrode with a third voltage that is a sum of the first voltage and the second voltage such that the second subset of the plurality of modulation structures rotate in a second direction different than the first direction. The light source may be configured to output coherent, polarized light to illuminate the one or more pixels of the pixel array. The holographic device may further comprise a polarizer configured to filter light output from the pixel array such that polarization modulation of the light is translated into amplitude modulation according to the amplitude component.

In an example, a holographic display, comprises a pixel array including one or more pixels, each pixel including a modulation structure configured to rotate in a first direction based on being driven at a first frequency and configured to rotate in a second direction, different than the first direction, based on being driven at a second frequency, a holographic data source configured to supply a holographic drive signal having at least the first frequency and the second frequency, the holographic drive signal including, for each pixel in each of a plurality of time-varying holographic image frames, a phase component defining phase modulation for the pixel in the first frequency, and a polarization component defining polarization modulation for the pixel in the second frequency, a drive array configured to, for each pixel, during each holographic image frame, modulate the modulation structure according to the phase component while driving the pixel at the first frequency, and modulate the modulation structure according to the polarization component while driving the pixel at the second frequency, a light source configured to output coherent, polarized light to illuminate the one or more pixels of the pixel array, and a polarizer configured to filter light output from the pixel array such that polarization modulation of the light is translated into amplitude modulation.

It will be understood that the configurations and/or approaches described herein are exemplary in nature, and that these specific implementations or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A holographic display, comprising:
 a pixel array including one or more pixels, each pixel including a liquid crystal host structure and a dye guest structure mixed with the liquid crystal host structure;
 a holographic data source configured to supply a holographic drive signal, the holographic drive signal including, for each pixel in each of a plurality of time-varying holographic image frames, a phase component defining phase modulation for the pixel and an amplitude component defining amplitude modulation for the pixel;
 a drive array configured to, for each pixel, during each holographic image frame, modulate the liquid crystal host structure according to the phase component and modulate the dye guest structure according to the amplitude component; and
 a light source configured to output coherent light to illuminate the one or more pixels of the pixel array.

2. The holographic display of claim 1, wherein the liquid crystal host structure differs in shape from the dye guest structure.

3. The holographic display of claim 1, wherein the dye guest structure has a rotational response that temporally lags or leads relative to a rotational response of the liquid crystal host structure.

4. The holographic display of claim 3, wherein the drive array is configured to, for each pixel of the pixel array, provide a drive signal to the pixel at a time prior to the light source illuminating the pixel, the time derived from the phase component based on a relationship of the rotational response of the dye guest structure relative to the rotational response of the liquid crystal host structure such that a delayed rotation of the dye guest structure relative to the liquid crystal host structure produces the phase modulation and the amplitude modulation when the pixel is illuminated by the light source.

5. The holographic display of claim 1, wherein the phase component of the holographic drive signal is represented as an argument of a complex function, and wherein the amplitude component of the holographic drive signal is represented as a modulus of the complex function.

6. The holographic display of claim 1, wherein the drive array is configured to, for each pixel of the pixel array, drive the pixel with a step signal to modulate the liquid crystal host structure and the dye guest structure of the pixel.

7. The holographic display of claim 1, wherein the drive array is configured to, for each pixel of the pixel array, drive the pixel with a pulse-width-modulated (PWM) signal to modulate the liquid crystal host structure and the dye guest structure of the pixel, the PWM signal including a first set of pulses configured to modulate the liquid crystal host structure and a second set of pulses configured to modulate the dye guest structure.

8. The holographic display of claim 1, wherein the drive array is configured to, for each pixel of the pixel array, drive the pixel with a drive signal having two or more frequencies, at least one of the two or more frequencies configured to modulate the liquid crystal host structure of the pixel, and at least one of the two or more frequencies configured to modulate the dye guest structure of the pixel.

9. A holographic display, comprising:
a pixel array including one or more pixels, each pixel including a phase-modulating structure and an amplitude-modulating structure different than the phase-modulating structure;
a holographic data source configured to supply a holographic drive signal, the holographic drive signal including, for each pixel in each of a plurality of time-varying holographic image frames, a phase component defining phase modulation for the pixel and an amplitude component defining amplitude modulation for the pixel;
a drive array configured to, for each pixel in each holographic image frame, modulate the phase-modulating structure according to the phase component and modulate the amplitude-modulating structure according to the amplitude component; and
a light source configured to output coherent light to illuminate the one or more pixels of the pixel array.

10. The holographic display of claim 9, wherein the phase component provides a full range of phase modulation, and wherein the amplitude component provides a limited range that is less than a full range of amplitude modulation.

11. The holographic display of claim 9, wherein the phase-modulating structure includes a liquid crystal host structure, and wherein the amplitude-modulating structure includes a dye guest structure mixed with the liquid crystal host structure.

12. The holographic display of claim 11, wherein the liquid crystal host structure differs in shape from the dye guest structure.

13. The holographic display of claim 9, wherein the amplitude-modulating structure has a rotational response that temporally lags or leads relative to a rotational response of the phase-modulating structure.

14. The holographic display of claim 13, wherein the drive array is configured to, for each pixel of the pixel array, provide a drive signal to the pixel at a time prior to the light source illuminating the pixel based on the holographic drive signal, the time derived from the phase component based on a relationship of the rotational response of the amplitude-modulating structure relative to the rotational response of the phase-modulating structure such that a delayed rotation of the amplitude-modulating structure relative to the phase-modulating structure produces the phase modulation and the amplitude modulation when the pixel is illuminated by the light source.

15. The holographic display of claim 9, wherein the phase component of the holographic drive signal is represented as an argument of a complex function, and wherein the amplitude component of the holographic drive signal is represented as a modulus of the complex function.

16. The holographic display of claim 9, wherein the drive array is configured to, for each pixel of the pixel array, drive the pixel with a step signal to modulate the phase-modulating structure and the amplitude-modulating structure of the pixel.

17. The holographic display of claim 9, wherein the drive array is configured to, for each pixel of the pixel array, drive the pixel with a pulse-width-modulated (PWM) signal to modulate the phase-modulating structure and the amplitude-modulating structure of the pixel, the PWM signal including a first set of pulses configured to modulate the phase-modulating structure and a second set of pulses configured to modulate the amplitude-modulating structure.

18. The holographic display of claim 9, wherein the drive array is configured to, for each pixel of the pixel array, drive the pixel with a drive signal having two or more frequencies, at least one of the two or more frequencies configured to modulate the phase-modulating structure of the pixel, and at least one of the two or more frequencies configured to modulate the amplitude modulating structure of the pixel.

19. The holographic display of claim 9, wherein each pixel includes a plurality of modulation structures, each modulation structure serving as both the phase-modulating structure and the amplitude-modulating structure;
wherein the pixel array includes, for each of the one or more pixels, an input side electrode positioned on a light-input side of the pixel and a plurality of interdigitated electrodes, including a first interdigitated electrode and a second interdigitated electrode, positioned on a light-output side of the pixel,
wherein the holographic data source is configured to supply the holographic drive signal with a polarization component defining, for each pixel, during each of the plurality of time-varying holographic image frames, polarization modulation for the pixel,
wherein the drive array is configured to, for each pixel, during each holographic image frame:
modulate a first subset of the plurality of modulation structures positioned proximate to the plurality of interdigitated electrodes according to the polarization component while driving the first interdigitated electrode with a first voltage and the second interdigitated electrode with a second voltage such that the first subset of modulation structures rotate in a first direction, and
modulate a second subset of the plurality of modulation structures positioned proximate to the input side electrode according to the phase component while driving the input side electrode with a third voltage that is a sum of the first voltage and the second voltage such that the second subset of the plurality of modulation structures rotate in a second direction different than the first direction;
wherein the light source is configured to output coherent, polarized light to illuminate the one or more pixels of the pixel array; and
wherein the holographic display further comprises a polarizer configured to filter light output from the pixel array such that polarization modulation of the light is translated into amplitude modulation according to the amplitude component.

20. A holographic display, comprising:
a pixel array including one or more pixels, each pixel including a modulation structure configured to rotate in a first direction based on being driven at a first frequency and configured to rotate in a second direction, different than the first direction, based on being driven at a second frequency;
a holographic data source configured to supply a holographic drive signal having at least the first frequency and the second frequency, the holographic drive signal including, for each pixel in each of a plurality of time-varying holographic image frames, a phase component defining phase modulation for the pixel in the first frequency, and a polarization component defining polarization modulation for the pixel in the second frequency;
a drive array configured to, for each pixel, during each holographic image frame, modulate the modulation structure according to the phase component while driving the pixel at the first frequency, and modulate the modulation structure according to the polarization component while driving the pixel at the second frequency;

a light source configured to output coherent, polarized light to illuminate the one or more pixels of the pixel array; and a polarizer configured to filter light output from the pixel array such that polarization modulation of the light is translated into amplitude modulation.

* * * * *